United States Patent
Itou

(10) Patent No.: US 12,331,826 B2
(45) Date of Patent: *Jun. 17, 2025

(54) DRIVING FORCE TRANSMISSION DEVICE

(71) Applicants: JATCO Ltd, Fuji (JP); NISSAN MOTOR CO., LTD., Yokohama (JP)

(72) Inventor: Tsutomu Itou, Fujinomiya (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,960

(22) Filed: Feb. 16, 2024

(65) Prior Publication Data
US 2024/0183440 A1 Jun. 6, 2024

Related U.S. Application Data

(63) Continuation of application No. 17/055,718, filed as application No. PCT/JP2019/018963 on May 13, 2019, now Pat. No. 11,940,043.

(30) Foreign Application Priority Data

May 17, 2018 (JP) .................................. 2018-095159

(51) Int. Cl.
F16H 57/04 (2010.01)
F16H 61/00 (2006.01)

(52) U.S. Cl.
CPC ....... *F16H 57/0423* (2013.01); *F16H 57/045* (2013.01); *F16H 57/0447* (2013.01); *F16H 2061/0037* (2013.01)

(58) Field of Classification Search
CPC . F16H 57/0423; F16H 57/045; F16H 57/0447
See application file for complete search history.

(56) References Cited

U.S. PATENT DOCUMENTS

| | | | |
|---|---|---|---|
| 4,736,819 A | 4/1988 | Muller | |
| 6,388,043 B1 | 5/2002 | Langer et al. | |
| 2006/0065487 A1 | 3/2006 | Tominaga et al. | |
| 2009/0014248 A1 | 1/2009 | Yamashita et al. | |

(Continued)

FOREIGN PATENT DOCUMENTS

| | | |
|---|---|---|
| JP | 2011-256918 A | 12/2011 |
| JP | 2012-102818 A | 5/2012 |

(Continued)

*Primary Examiner* — Minh Truong
(74) *Attorney, Agent, or Firm* — Foley & Lardner LLP

(57) ABSTRACT

A baffle plate including a body portion, a cover portion and a seal member, a final gear and a driven sprocket disposed in an accommodating chamber of the baffle plate, an oil pump serving as a source of oil for lubrication, and an oil pan are provided. At least one of the body portion, the cover portions and the seal members includes a material that shrinks as the temperature of the oil decreases. The baffle plate is dimensioned such that a gap is sealed by the seal member when the temperature of the oil is equal to or higher than a predetermined oil temperature and an aperture is formed when the temperature of the oil is less than the predetermined oil temperature. The gap is the gap between an inner circumference of an outer wall portion of the body portion and each of a base portion of the cover portion and a base portion of the cover portion.

8 Claims, 7 Drawing Sheets

(56) References Cited

U.S. PATENT DOCUMENTS

| | | |
|---|---|---|
| 2010/0180721 A1 | 7/2010 | Quehenberger |
| 2011/0162482 A1 | 7/2011 | Jacobs et al. |
| 2017/0102065 A1 | 4/2017 | Ohmura et al. |
| 2018/0066745 A1 | 3/2018 | Singh et al. |

FOREIGN PATENT DOCUMENTS

| | | |
|---|---|---|
| JP | 5844019 B1 | 1/2016 |
| JP | 2016-023735 A | 2/2016 |
| JP | 2016-061333 A | 4/2016 |
| JP | 2018-063036 A | 4/2018 |
| JP | 2019-039479 A | 3/2019 |
| JP | 2019-152278 A | 9/2019 |

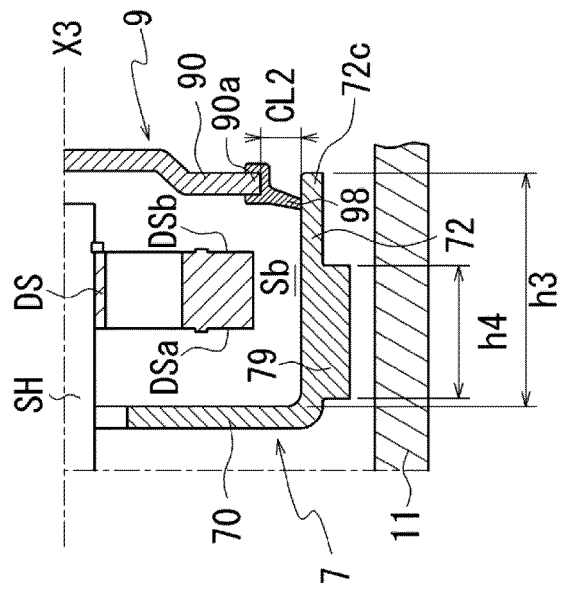
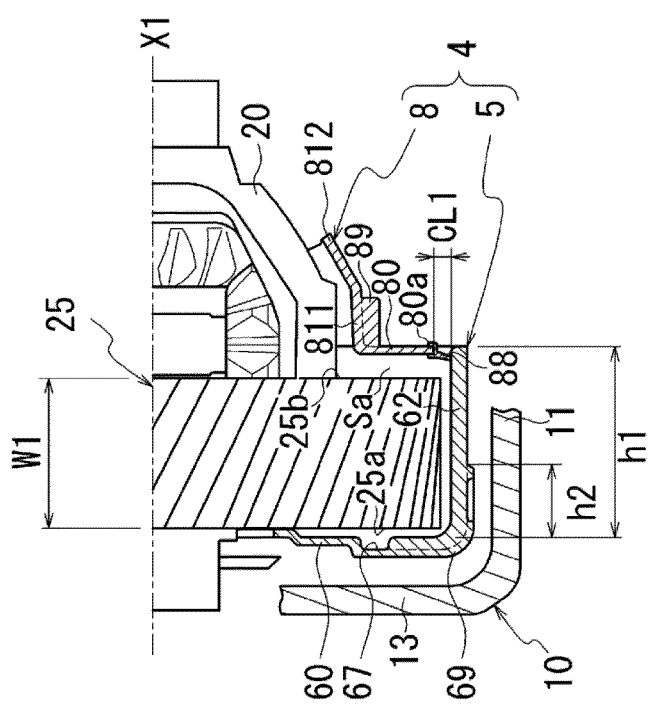
FIG. 2A
FIG. 2B

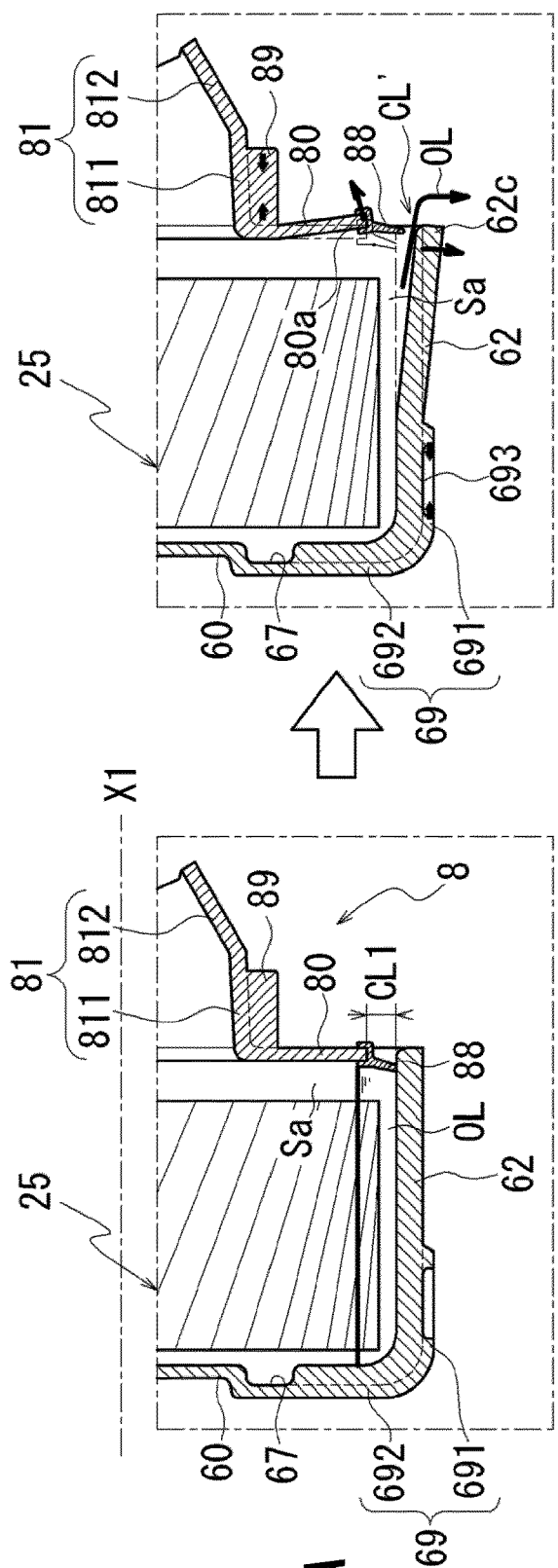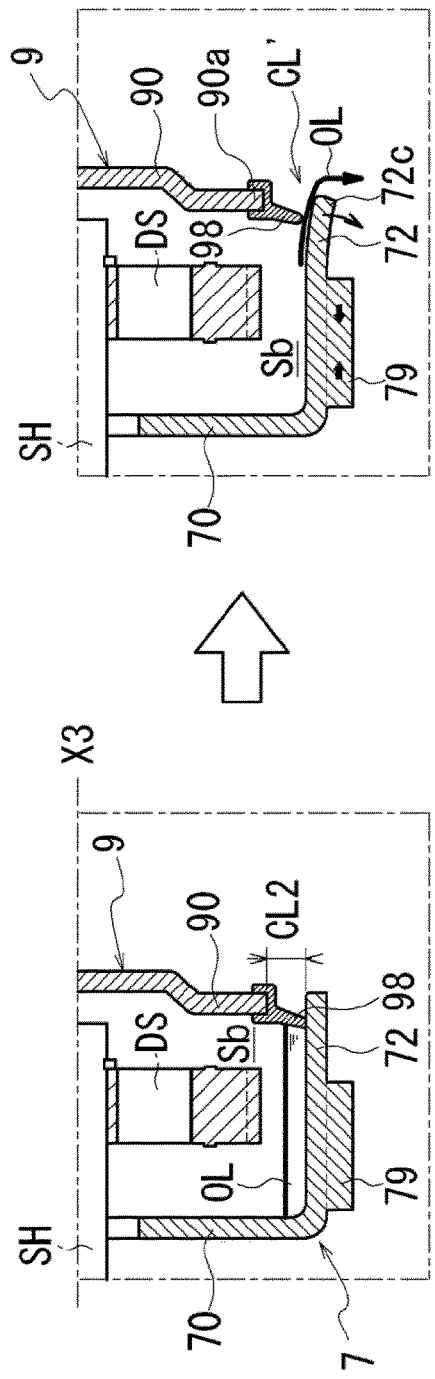

DRIVING FORCE TRANSMISSION DEVICE

TECHNICAL FIELD

The present invention relates to a driving force transmission device.

BACKGROUND ART

The patent document 1 discloses a configuration in which a chain sprocket, which is a rotating member, is surrounded by a pair of baffle plates.

The patent document 2 discloses a configuration in which a gear, which is a rotating member, is surrounded by a pair of baffle plates.

The baffle plate of the patent document 2 is provided to surround a final gear in a differential device.

In the driving force transmission device including the final gear, in order to improve the fuel consumption by reducing the stirring resistance of the rotating member (final gear), it is basically preferable to suppress the amount of oil entering the space surrounded by the pair of baffle plates.

On the other hand, when the oil temperature becomes extremely low, an exceptional situation occurs. Namely, oil return from various routes in the whole driving force transmission device to an oil reservoir (oil pan) from which an oil pump sucks oil occurs at first. Then, when the oil temperature decreases, the viscosity of the oil increases and the fluidity of the oil decreases.

Therefore, in the whole driving force transmission device, when the oil temperature becomes low, the oil return to the oil reservoir (oil pan) from which the oil pump sucks the oil becomes slow.

Therefore, when the oil temperature becomes low, it is required to promote the oil return to the oil reservoir.

PRIOR ART DOCUMENTS

Patent Document

Patent Document 1: JP2012-102818A
Patent Document 2: JP5844019B

SUMMARY OF INVENTION

The present invention provides a driving force transmission device including:
- a baffle plate portion including a pair of baffle plates and a seal member disposed in a region between the pair of baffle plates;
- a rotating member disposed within a rotating member chamber that is a space surrounded by the baffle plate portion;
- an oil pump that serves as a source of oil for lubrication supplied to the rotating member; and
- an oil pan in which the oil is stored and from which the oil pump sucks the oil, wherein
- at least one of, one of the pair baffle plates, the other one of the pair of baffle plates and the seal member is formed by including a material that shrinks as an oil temperature decreases, and
- the baffle plate portion is dimensioned such that the region between the pair of baffle plates is sealed by the seal member when the oil temperature is equal to or higher than a predetermined oil temperature and an aperture is formed in the region between the pair of baffle plates when the oil temperature is less than the predetermined oil temperature.

According to the present invention, when the oil temperature becomes low, the oil return to the oil reservoir can be promoted.

BRIEF DESCRIPTION OF DRAWINGS

FIGS. 2A and 2B are diagrams illustrating an arrangement of baffle plates in the transmission case.
FIGS. 7A and 7B are view illustrating an operation of the baffle plates.

BEST MODE FOR CARRYING OUT THE INVENTION

Hereinafter, an embodiment of the present invention will be described by taking a case where a driving force transmission device is an automatic transmission 1 for a vehicle as an example.

Figure 1A:
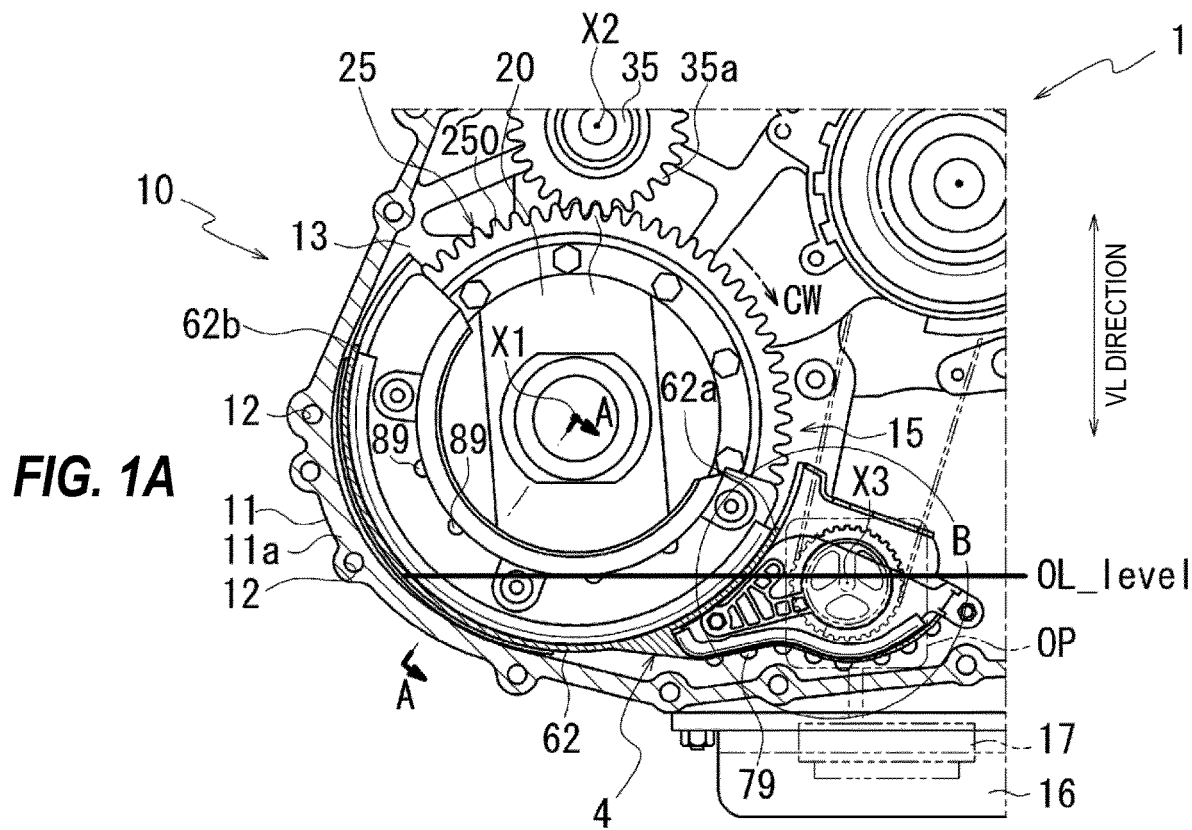
FIGS. 1A and 1B are diagrams for explaining a main part of a transmission case.
Figure 1B:
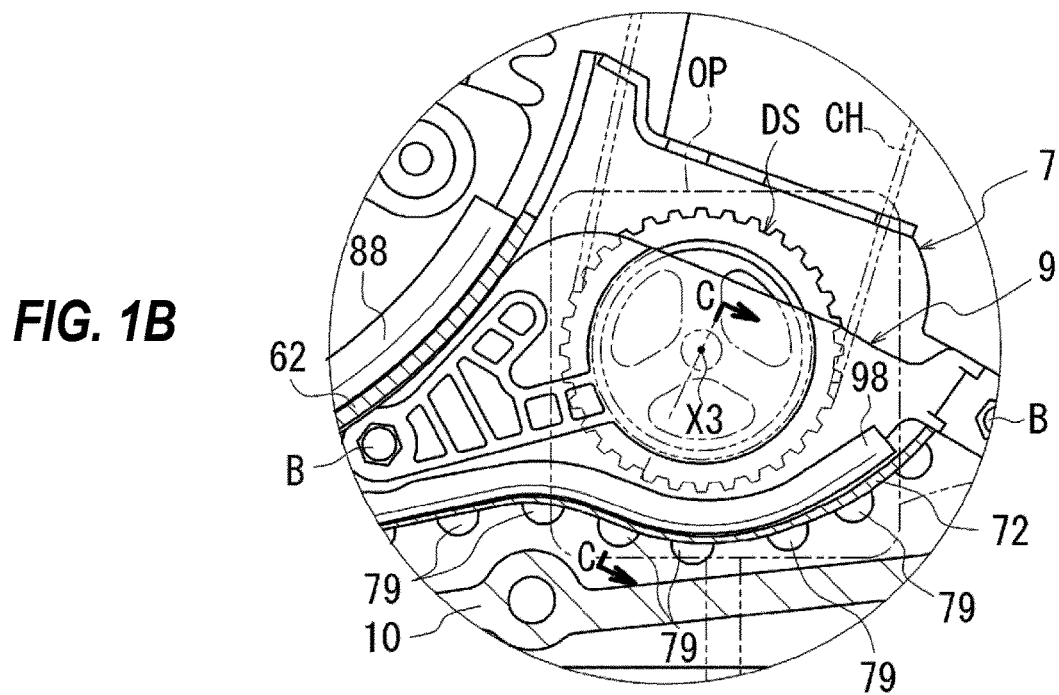

FIGS. 1A and 1B are diagrams for explaining a main part of a transmission case 10 and it is a diagram for explaining surroundings of an accommodating portion 15 of a differential device in a transmission case 10 of the automatic transmission 1.

FIG. 1A is a view of the transmission case 10 seen from a torque converter (not shown). FIG. 1B is an enlarged view of an area B in FIG. 1A.

In FIGS. 1A and 1B, a joint surface between the transmission case 10 and the converter housing (not shown) is indicated by hatching on the end surface on the paper front side of the outer wall portion 62 of the baffle plate 4.

FIGS. 2A and 2B are diagrams illustrating an arrangement of the baffle plate 4 in the transmission case 10. FIG. 2A is a view showing the baffle plate 4 cut along the line A-A in FIG. 1A, and FIG. 2B is a view showing the baffle plate 4 cut along the line C-C in FIG. 1B.

In the following, the positional relationship of the components in the arrangement of the transmission case 10 in FIGS. 1A and 1B will be described.

In the following description, "upper side (upper)" means the upper side in the vertical line VL direction based on the installation state of the automatic transmission, and "lower side (lower)" means the lower side in the vertical line direction based on the installation state of the automatic transmission.

As shown in FIGS. 1A and 1B, at the lower portion of the transmission case 10, the accommodating portion 15 for the differential device is provided. The torque converter side, not shown (paper front side) of the accommodating portion 15 is open.

In the central portion of the accommodating portion 15, a differential case 20 is rotatably supported. A final gear 25 having a ring shape when viewed from the direction in the rotation axis X1 of the differential case 20 is fixed on an outer periphery of the differential case 20.

On an outer periphery of the final gear 25, teeth portions 250 are formed over the entire circumference in the circumferential direction around the rotation axis X1.

The teeth portions 250 of the final gear 25 are inclined at a predetermined angle with respect to the rotation axis X1 when viewed from the radial direction of the rotation axis X1. The final gear 25 is a helical gear with the teeth portions 250 slanted.

At the upper side of the final gear 25, a reduction gear 35 is positioned. Teeth portions 35a on an outer periphery of the reduction gear 35 mesh with the teeth portions 250 of the final gear 25.

In the transmission case 10, the reduction gear 35 is rotatably provided about the rotation axis X2. The rotation axis X2 of the reduction gear 35 is provided above the rotation axis X1 of the final gear 25 and parallel to the rotation axis X1.

An output rotation of a transmission mechanism (not shown) is input to the reduction gear 35 and the reduction gear 35 rotates about the rotation axis X2. Therefore, the final gear 25, the outer periphery of which engages with the reduction gear 35, rotates about the rotation axis X1 by the rotation driving force transmitted from the reduction gear 35.

During forward running of the vehicle equipped with the automatic transmission 1, the final gear 25 rotates in the clockwise direction CW (forward direction) in the figure.

When viewed from the direction of the rotation axis X1, a peripheral wall portion 11 of the transmission case 10 has an arc shape surrounding the outer periphery of the final gear 25 in the vicinity region of the final gear 25.

At the peripheral wall portion 11, a plurality of bolt holes 12 are provided at intervals in the circumferential direction. An end surface 11a of the peripheral wall portion 11, which is at the paper front side, has a joining surface with a converter housing (not shown) surrounding the torque converter (not shown).

In the transmission case 10, a wall portion 13 covering a side surface of the final gear 25 is provided inside of the peripheral wall portion 11. As shown in FIG. 2A, the wall portion 13 is provided at the left side of the final gear 25 in the drawing and extends along a side surface 25a of the final gear 25.

In the transmission case 10, a baffle plate 4 (body portion 5, cover portion 8 and cover portion 9) is provided (see FIGS. 1A, 1B, 2A, 2B and 3).

The baffle plate 4 is provided across a region where the final gear 25 is provided and a region where a driven sprocket DS is provided in the transmission case 10.

Figure 3:
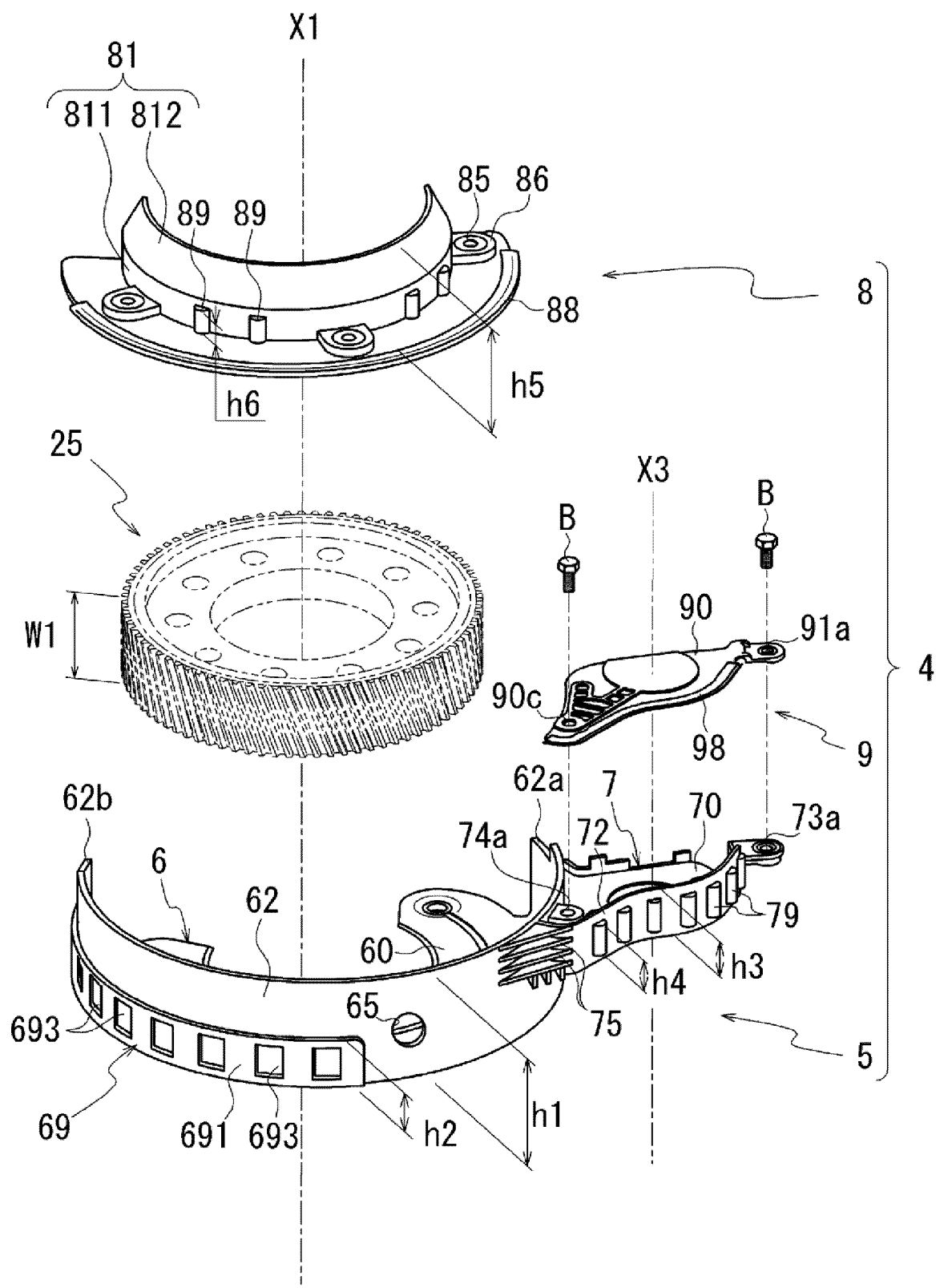
FIG. 3 is a diagram illustrating the baffle plates.

FIG. 3 is a diagram for explaining the baffle plate 4 (body portion 5, cover portion 8, and cover portion 9). In FIG. 3, the final gear 25 is shown by a virtual line, and the position of each component of the baffle plate 4 (body portion 5, cover portion 8 and cover portion 9) and the final gear 25 are displaced in the direction of the rotation axis X1.

Figure 4A:
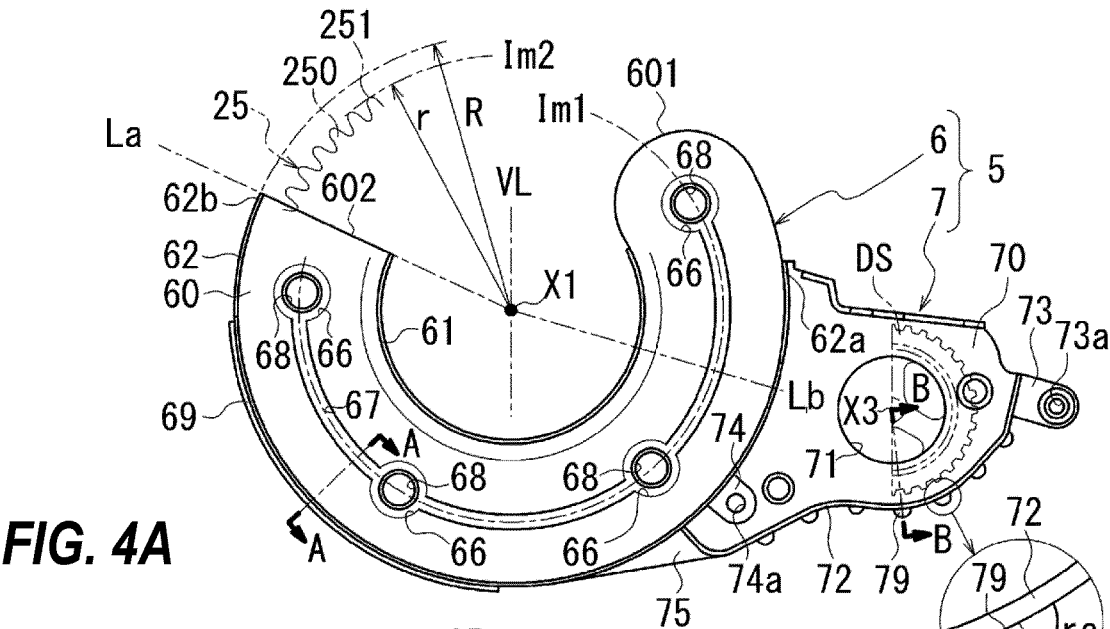
FIGS. 4A-4C are views for explaining a body portion of the baffle plates.
Figure 4B:
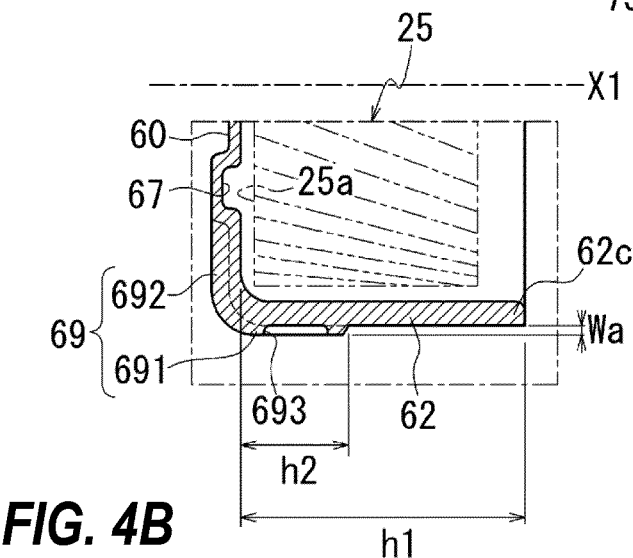
Figure 4C:
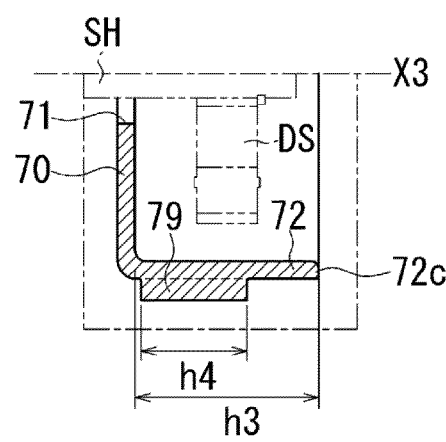

FIGS. 4A-4C are diagrams illustrating a body portion 5 of the baffle plate 4. FIG. 4A is a view of the body portion 5 seen from the direction of the rotation axis X1. FIG. 4B is the A-A sectional view of FIG. 4A. FIG. 4C is the B-B cross-sectional view of FIG. 4A.

In FIG. 4A, a part of the driven sprocket DS is shown by a virtual line. In FIG. 4B, the final gear 25 is shown by a virtual line. In FIG. 4C, a part of the driven sprocket DS and a part of a drive shaft SH are shown by a virtual line.

As shown in FIG. 3, the baffle plate 4 has the body portion 5 fixed to the transmission case 10, the cover portion 8 fixed to the converter housing (not shown), and the cover portion 9 fixed to the body portion 5. In this embodiment, the baffle plate 4 is formed of a polymer material having a large linear expansion coefficient at low temperatures.

When the cover portion 8 is assembled to the body portion 5, an accommodating chamber Sa (rotating member accommodating chamber) for the final gear 25 is formed between the body portion 5 and the cover portion 8 (see FIG. 2A).

When the cover portion 9 is assembled to the body portion 5, an accommodating chamber Sb (rotating member accommodating chamber) for the driven sprocket DS is formed between the body portion 5 and the cover portion 9 (see FIG. 2B).

As shown in FIG. 4A, the body portion 5 of the baffle plate 4 has a first cover portion 6 covering the side surface of the final gear 25, and a second cover portion 7 covering the side surface of the driven sprocket DS.

The first cover portion 6 and the second cover portion 7 are integrally formed by resin molding.

When viewed from the direction of the rotation axis X1, the first cover portion 6 has a plate shape base portion 60.

The base portion 60 extends in the circumferential direction around the rotation axis X1. When viewed from the direction of the rotation axis X1, the base portion 60 has an arc shape.

The outer diameter R to the outer periphery of the base portion 60 is set to a diameter larger than the radius r to the outer periphery of the final gear 25.

As shown in FIG. 2A, in the transmission case 10, the side surface 25a of the final gear 25 at the wall portion 13 side is covered by the base portion 60 of the first cover portion 6.

As shown in FIG. 4A, the base portion 60 is provided with a plurality of through holes 68. Each of the through holes 68 penetrates the base portion 60 in the direction of the rotation axis X1.

When viewed from the direction of the rotation axis X1, the through holes 68 are provided at intervals in the circumferential direction around the rotation axis X1 on an imaginary circle Im1 centered on the rotation axis X1.

The first cover portion 6 of the baffle plate 4 is fixed to the transmission case 10 by bolts (not shown) inserted into the through holes 68.

The base portion 60 further includes concave portions 66 surrounding the through holes 68 respectively and a concave groove 67.

When viewed from the direction of the rotation axis X1, each of the concave portions 66 has a circle shape surrounding the through hole 68 and each of the concave portions 66 is formed to be recessed toward the paper back side.

As shown in FIGS. 4A and 4B, when viewed from the direction of the rotation axis X1, the concave groove 67 is formed recessed toward the paper back side.

The concave groove 67 connects the concave portions 66 and 66 adjacent to each other in the circumferential direction around the rotation axis X1.

When viewed from the direction of the rotation axis X1, the concave groove 67 is formed in an arc shape along the imaginary circle Im1 described above.

When viewed from the direction of the rotation axis X1, one end 601 of the base portion 60 is formed in an arc shape surrounding the through hole 68 provided at the one end 601 side while keeping a predetermined distance.

The other end 602 of the base portion 60 is formed in a straight line along a line segment La extending in the radial direction of the rotation axis X1. Here, when viewed from the direction of the rotation axis X1, the line segment La is a straight line orthogonal to the rotation axis X1 and extending in the radial direction of the rotation axis X1.

An inner wall portion 61 protruding toward the paper front side is provided at the inner circumference edge of the base portion 60.

In a plan view, the inner wall portion 61 has an arc shape, and the inner wall portion 61 is provided to have substantially the same protruding height over the entire length in the circumferential direction around the rotation axis X1.

An outer wall portion 62 protruding toward the paper front side is provided at the outer circumference edge of the base portion 60.

The outer wall portion 62 is provided in a range extending from one longitudinal end 601 of the base portion 60 to the other longitudinal end 602 of the base portion 60.

When viewed from the direction of the rotation axis X1, the outer wall portion 62 has an arc shape along the outer periphery of the final gear 25.

As shown in FIG. 1A, in the transmission case 10, the oil OL is stored in the lower area in the vertical line VL direction in the installation state of the automatic transmission.

The baffle plate 4 is arranged such that one end 62a and the other end 62b of the outer wall portion 62 in the circumferential direction around the rotation axis X1 are positioned above the oil level OL_level of the oil OL.

At the outer wall portion 62, an oil hole 65 is provided at a position lower than the oil level OL_level of the oil OL (see FIG. 3).

The oil hole 65 is provided to penetrate the outer wall portion 62 in the thickness direction (radial direction of the rotation axis X1).

As shown in FIG. 3, the outer wall portion 62 is provided to have a predetermined height h1 in the direction of the rotation axis X1.

The height h1 of the outer wall portion 62 is set to be a height larger than the width W1 of the final gear 25 in the direction of the rotation axis X1 (h1>W1).

Therefore, as shown in FIG. 4B, when viewed from the radial direction of the rotation axis X1, at the lower side of the transmission case 10, the outer periphery of the final gear 25 is covered by the outer wall portion 62 surrounding the final gear 25 while keeping a predetermined distance (for example, 2 mm).

In the present embodiment, the oil hole 65 is provided at a substantially intermediate position of the outer wall portion 62 in the direction of the rotation axis X1.

As shown in FIG. 4B, a belt shape rib 69 is provided on the outer periphery of the outer wall portion 62.

The belt shape rib 69 is formed of a material having a large linear expansion coefficient at low temperatures like the material constituting the body portion 5 (outer wall portion 62, base portion 60).

The belt shape rib 69 may be formed of a material having a larger linear expansion coefficient at low temperatures than the material constituting the body portion 5 (outer wall portion 62, base portion 60).

The belt shape rib 69 is provided in a predetermined range in the circumferential direction around the rotation axis X1, the predetermined range being a range extending in a direction away from the second cover portion 7 (left direction in FIG. 4A) from the vicinity of the oil hole 65.

The region provided with the belt shape rib 69 is a region at the downstream side of the oil hole 65 in the rotation direction of the final gear 25 during forward running of the vehicle and in the moving direction of the oil OL scraped by the rotating final gear 25.

The belt shape rib 69 is provided across the outer wall portion 62 and the base portion 60 at the boundary portion between the outer wall portion 62 and the base portion 60.

As shown in FIG. 4B, the belt shape rib 69 includes a deformation promoting portion 691 integrally formed on the outer periphery of the outer wall portion 62, and a bottom portion 692 integrally formed on the back surface of the base portion 60.

The deformation promoting portion 691 protrudes outwardly from the outer periphery of the outer wall portion 62 by a predetermined width Wa (for example, 4 mm). The deformation promoting portion 691 is provided in a predetermined angle range in the circumferential direction around the rotation axis X1, the predetermined angle range is an angle range from the vicinity of the oil hole 65 to the vicinity of the other end 62b of the outer wall portion 62.

The height h2 of the deformation promoting portion 691 in the direction of the rotation axis X1 is approximately half of the height h1 of the outer wall portion 62. The deformation promoting portion 691 is provided at a position away from the end portion 62c (free end) of the outer wall portion 62 and close to the base portion 60 (left side in FIG. 4B).

As shown in FIG. 3, at the deformation promoting portion 691, a plurality of concave portions 693 (slits) are provided at intervals in the circumferential direction. When viewed from the radial direction of the rotation axis X1, each of the concave portions 693 has a rectangular shape and the outer periphery of the outer wall portion 62 is exposed through the concave portions 693.

The bottom portion 692 extend inward in the radial direction on the outer surface of the base portion 60, and extends to the region of the concave groove 67 described above (see FIG. 4B). Since the concave groove 67 is formed by recessing the base portion 60 as described above, the region provided with the concave groove 67 and the bottom portion 692 are positioned at the same level at the outer surface of the base portion 60.

As shown in FIG. 4A, a base portion 70 of the second cover portion 7 extends in the radial direction of the rotation axis X1 from the outer periphery of the outer wall portion 62 of the first cover portion 6.

The base portion 70 has a tapered shape in which the width in the circumferential direction around the rotation axis X1 becomes narrower as the distance from the first cover portion 6 increases.

The base portion 70 of the second cover portion 7 and the base portion 60 of the first cover portion 6 are arranged by displacing in the direction of the rotation axis X1. In FIG. 4A, the base portion of the second cover portion 7 is positioned at the paper front side with respect to the base portion 60 of the first cover portion 6.

At the distal end portion in the extending direction of the base portion 70, a mounting portion 73 of the cover portion 9 described later is provided. The mounting portion 73 is provided integrally with the base portion 70. The mounting portion 73 extends in a direction away from the base portion 70, and a bolt hole 73a opens at the distal end side of the mounting portion 73.

An outer wall portion 72 is provided at the boundary portion between the mounting portion 73 and the base portion 70. In FIG. 4A, the outer wall portion 72 extends toward the paper front side, and the outer wall portion 72 extends along the side edge of the base portion 70 from the boundary portion between the mounting portion 73 and the base portion 70 to the outer wall portion 62 of the first cover portion 6.

In the vicinity of the connecting portion between the outer wall portion 72 of the second cover portion 7 and the outer wall portion 62 of the first cover portion 6, a mounting portion 74 of the cover portion 9 described later is provided. The mounting portion 74 is provided in the region between the outer wall portion 62 and the outer wall portion 72 and a bolt hole 74a opens at the center of the mounting portion 74.

The mounting portion 74 and the mounting portion 73 described above are provided to have the same height in the direction of the rotation axis X1.

In the vicinity of the connecting portion between the outer wall portion 72 of the second cover portion 7 and the outer wall portion 62 of the first cover portion 6, plate shape ribs 75 are provided.

The plate shape ribs 75 are provided across the outer wall portion 72 and the outer wall portion 62. A plurality of plate shape ribs 75 are provided at predetermined intervals in the direction of the rotation axis X1 (see FIG. 3).

A plurality of ribs 79 are provided at intervals in the longitudinal direction on the outer periphery of the outer wall portion 72.

The ribs 79 are also formed of a material having a large linear expansion coefficient at low temperatures like the material constituting the second cover portion 7 (outer wall portion 72, base portion 70).

The ribs 79 may be formed of a material having a larger linear expansion coefficient at low temperatures than the material constituting the second cover portion 7 (outer wall portion 72, base portion 70).

As shown in FIG. 4A, when viewed from the direction of the rotation axis, the shape of each of the ribs 79 is a semicircular shape having the radius ra, and each of the ribs 79 protrudes outward from the outer periphery of the outer wall portion 72 while directing the apex P outward.

As shown in FIG. 4C, the height h4 of the ribs 79 in the direction of the rotation axis X3 is lower than the height h3 of the outer wall portion 72 in the direction of the rotation axis X1 (h3>h4). The ribs 79 are provided at a position closer to the base portion 70 on the outer wall portion 72. The ribs 79 are provided at a position away from the end portion 72c (free and) of the outer wall portion 72 and close to the base portion 70 (left side in FIG. 4C).

As shown in FIG. 4A, a through hole 71 is provided in the center portion of the base portion 70. The drive shaft SH (see FIG. 4C) of the oil pump OP (see FIGS. 1A and 1B) penetrates the through hole 71.

As shown in FIGS. 1A and 1B, in the transmission case 10, the oil pump OP is disposed at the paper back side of the second cover portion 7 and the driven sprocket DS is disposed at the paper front side of the second cover portion 7.

At the second cover portion 7, the driven sprocket DS is connected to the drive shaft SH in the region between the outer wall portion 72 and the outer wall portion 62 of the first cover portion 6, and the driven sprocket DS and the drive shaft SH are adapted to rotate integrally.

In the automatic transmission, the rotational driving force input from the engine is transmitted to the driven sprocket DS via the chain CH.

Then, the driven sprocket DS and the drive shaft SH rotate about the rotation axis X3 to drive the oil pump OP. As a result, the oil OL in the oil pan 16 is sucked by the oil pump OP through an oil strainer 17 (see FIG. 1A). Then, the oil OL pressurized by the oil pump OP is supplied to the hydraulic control circuit provided in the automatic transmission.

Figure 5A:
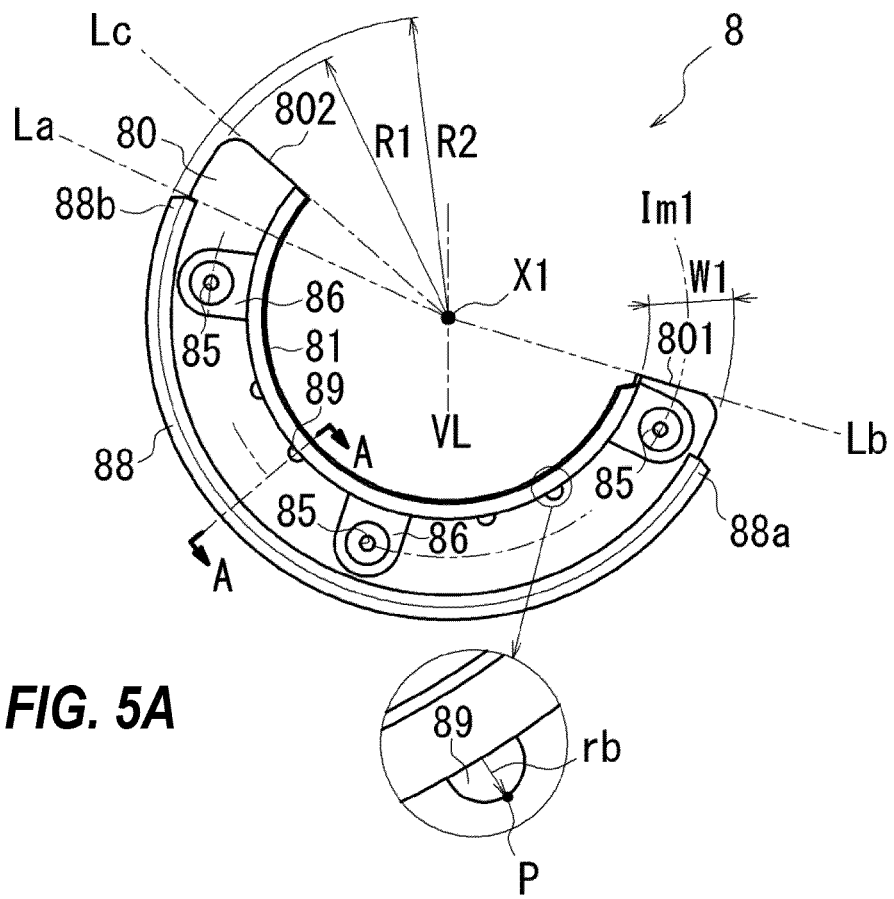
FIGS. 5A and 5B are views for explaining a cover portion of the baffle plates.
Figure 5B:
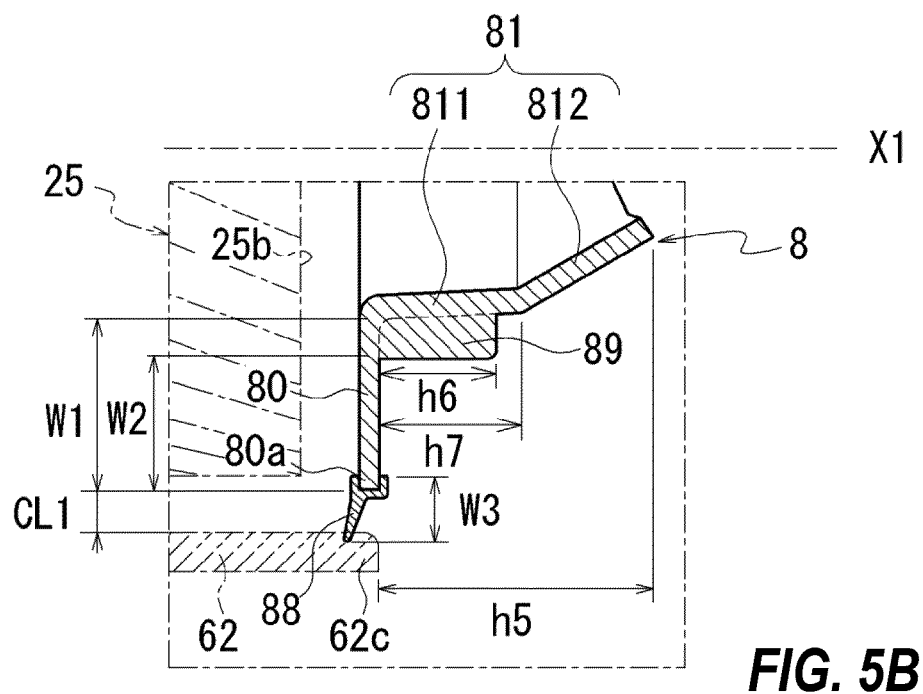

FIGS. 5A and 5B are views for explaining the cover portion 8 of the baffle plate 4. FIG. 5A is a view of the cover portion 8 seen from the direction of the rotation axis X1. FIG. 5B is the A-A cross-sectional view in FIG. 5A. In FIG. 5B, a part of the final gear 25 in FIG. 5B is shown by a virtual line.

As shown in FIGS. 5A and 5B, the cover portion 8 has a plate shape base portion 80.

When viewed from the direction of the rotation axis X1, the base portion 80 extends in the circumferential direction around the rotation axis X1, and when viewed from the direction of the rotation axis X1, the base portion 80 has an arc shape.

As shown in FIGS. 5A and 5B, the outer diameter R1 to the outer periphery of the base portion 80 is smaller than the outer diameter R to the outer wall portion 62 of the body portion 5 (see FIG. 4A) and larger than the radius r to the outer periphery of the final gear 25 (see FIG. 4A).

Therefore, a gap CL1 is formed between the outer peripheral portion 80a of the base portion 80 and the outer wall portion 62 (see FIG. 5B).

As shown in FIG. 5B, in the automatic transmission 1, the side surface 25b of the final gear 25 at the converter housing (not shown) side is covered by the base portion 80 of the cover portion 8.

The base portion 80 is provided with a plurality of through holes 85. Each of the through holes 85 penetrates the base portion 80 in the direction of the rotation axis X1.

When viewed from the direction of the rotation axis X1, each of the through holes 85 is located on a virtual circle Im1 centered on the rotation axis X1. The through holes 85 are provided at intervals in the circumferential direction around the rotation axis X1.

The cover portion 8 of the baffle plate 4 is fixed to the converter housing (not shown) by bolts (not shown) inserted into the through holes 85.

The base portion 80 is further provided with concave portions 86 surrounding the through holes 85 respectively.

As shown in FIG. 5A, when viewed from the direction of the rotation axis X1, each of the concave portions 86 is formed to be recessed toward the paper front side.

When viewed from the direction of the rotation axis X1, one end 801 and the other end 802 of the base portion 80 are formed in a straight line along the line segments Lb and Lc extending in the radial direction of the rotation axis X1, respectively.

Here, when viewed from the direction of the rotation axis X1, the line segments Lb and Lc are straight lines orthogonal to the rotation axis X1 and extending in the radial direction of the rotation axis X1.

As shown in FIG. 5A, the line segment Lc is positioned above the line segment La. Therefore, when the cover portion 8 and the body portion 5 are assembled, the other end 802 of the cover portion 8 is positioned higher than the other end 602 the body portion 5.

An inner wall portion 81 protruding toward the paper front side is provided at the inner circumference edge of the base portion 80.

When viewed from the direction of the rotation axis X1, the inner wall portion 81 has an arc shape and has substantially the same protruding height h5 over the entire length in the circumferential direction around the rotation axis X1 (see FIG. 5B).

As shown in FIG. 5B, the inner wall portion 81 has a first cylindrical portion 811 substantially parallel to the rotation axis X1, and a second cylindrical portion 812 inclined such that it approaches the rotation axis X1 as the distance from the first cylindrical portion 811 increases.

Such that the inner wall portion 81 surrounds the outer periphery of the differential case 20 while keeping a predetermined distance, the inclinations with respect to the rotation axis X1 are different between the first cylindrical portion 811 and the second cylindrical portion 812.

As shown in FIG. 5B, when viewed in the cross-sectional view of the cover portion 8, the base portion 80, the first cylindrical portion 811, and the second cylindrical portion 812 are aligned in this order from the final gear 25 side in the direction of the rotation axis X1.

A belt shape seal member 88 is fit from the outside on the outer peripheral portion 80a of the base portion 80.

The seal member 88 is member having a predetermined width W3 formed of a material having a large linear expansion coefficient (for example, rubber), and has an arc shape when viewed from the direction of the rotation axis X1 (see FIG. 5A).

The outer diameter R2 of the seal member 88 is set slightly larger than the outer diameter R to the outer wall portion 62 of the body portion 5 (see FIG. 4A).

As shown in FIG. 2A, when the cover portion 8 is assembled to the body portion 5, the outer peripheral edge of the seal member 88 is pressed against the inner periphery of the outer wall portion 62, and the gap CL1 between the outer wall portion 62 of the body portion 5 and base portion of the cover portion 8 is sealed by the seal member 88. In this state, the accommodating chamber Sa for the final gear 25 (rotating member accommodating chamber) is formed outside the final gear 25.

A plurality of ribs 89 are provided at intervals in the longitudinal direction on the outer periphery of the first cylindrical portion 811.

The ribs 89 are formed of a material having a large linear expansion coefficient at low temperatures like the material constituting the cover portion 8 (inner wall portion 81, base portion 80).

The ribs 89 may be formed of a material having a higher linear expansion at low temperatures than the material constituting the cover portion 8 (inner wall portion 81, base portion 80).

As shown in FIG. 5A, when viewed from the direction of the rotational axis, the shape of each of the ribs 89 is a semicircular shape having the radius rb and each of the ribs 89 protrudes outward from the outer periphery of the first cylindrical portion 811 while directing the apex P outward.

The ribs 89 are provided across the base portion 80 and the first cylindrical portion 811, and the height h6 of the ribs 89 in the direction of the rotation axis X1 is lower than the height h7 of the first cylindrical portion 811 in the direction of the rotation axis X1 (h7>h6). The ribs 89 are provide on the first cylindrical portion 811 while keeping a distance from the second cylindrical portion 812.

The ribs 89 have a larger contact area with the first cylindrical portion 811 than with the base portion 80.

The ribs 89 are provided at a position away from the outer peripheral portion 80a (free end) of the base portion 80 and close to the inner wall portion 81 (upper side in FIG. 5B).

When the cover portion 8 is assembled to the body portion 5, the distal end of the seal member 88 is elastically pressed against the inner periphery of the outer wall portion 62 of the body portion 5, and the gap CL1 between the outer wall portion 62 of the body portion 5 and the outer periphery of the base portion 80 of the cover portion 8 is sealed by the seal member 88.

As shown in FIG. 2A, in a state where the cover portion 8 is assembled to the body portion 5, as for the lower region of the final gear 25, one side face 25a and the other side face 25b in the direction of the rotation axis X are covered by the base portion 60 of the body portion 5 and the base portion 80 of the cover portion 8 respectively, and the outer periphery of the final gear 25 is covered by the outer wall portion 62.

Therefore, the lower region of the final gear 25 is disposed in a state in which the lower region of the final gear 25 is surrounded by the baffle plate 4 (baffle plate portion) disposed close to the final gear 25.

As shown in FIG. 5A, in the present embodiment, one longitudinal end 88a of the seal member 88 is located in the vicinity of one end 801 (line segment Lb) of the base portion 80, and the other end 88b extends to the line segment La.

The other end 88b of the seal member 88 located at the side toward which the oil OL scraped by the final gear 25 moves (left side in FIG. 5A) is positioned higher than the one end 88a of the seal member 88.

Figure 6A:
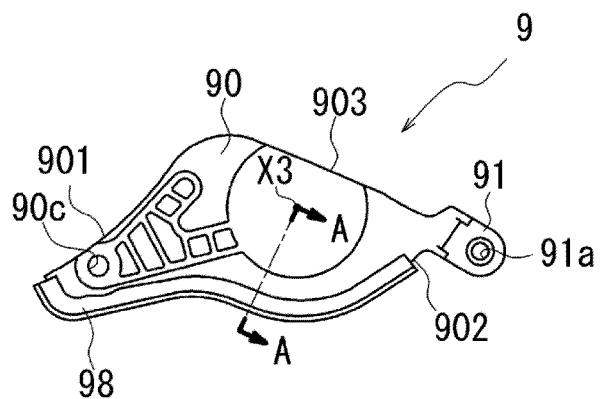
FIGS. 6A and 6B are views for explaining a cover portion of the baffle plates.
Figure 6B:
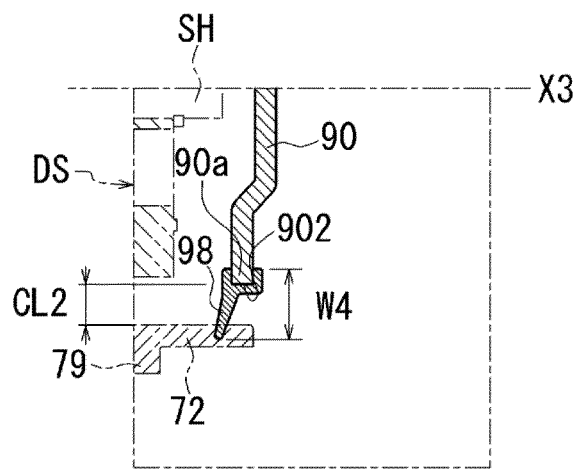

FIGS. 6A and 6B is a view for explaining the cover portion 9 of the baffle plate 4. FIG. 6A is a view of the cover portion 9 seen from the direction of the rotation axis X3. FIG. 6B is the A-A cross-sectional view in FIG. 6A.

In FIG. 6B, a part of the outer wall portion 72 of the body portion 5 and a part of the driven sprocket DS and a part of the drive shaft SH are shown in a virtual line.

As shown in FIGS. 6A and 6B, the cover portion 9 has a plate shape base portion 90. The base portion 90 is formed in a shape capable of overlapping with the base portion 70 of the second cover portion 7 when viewed in the direction of the rotation axis X3 (see FIG. 3).

When viewed from the direction of the rotation axis X1, the base portion 90 has a first side edge 901 having a shape along the outer periphery of the outer wall portion 62 of the first cover portion 6 and a second side edge 902 having a shape along the inner periphery of the outer wall portion 72 of the second cover portion 7.

One end portions in the longitudinal direction of the first side edge 901 and the second side edge 902 are connected with each other. At the other end portion of the second side edge 902, a mounting portion 91 having a bolt hole 91a is provided.

A third side edge 903 connected to the other end portion of the first side edge 901 is connected to the mounting portion 91 by passing the outside of the rotation axis X3 of the driven sprocket DS and the opposite side of the second side edge 902 with respect to the rotation axis X3.

At the base portion 90, the bolt hole 90c is provided in the vicinity of the connecting portion between the first side edge 901 and the second side edge 902.

The bolt hole 91a and the bolt hole 90c of the cover portion 9 are provided at positions corresponding to the bolt holes 73a, 74a (see FIG. 4A) of the second cover portion 7 described above, respectively.

When the base portion 90 is placed on the mounting portions 73, 74 of the second cover portion 7, the second side edge 902 is held while keeping the gap CL2 from the outer wall portion 72 of the second cover portion 7.

With the mounting portion 74 and the mounting portion 73, the cover portion 9 is held substantially parallel to the base portion 70 of the second cover portion 7 and fixed to the second cover portion 7 by bolts B (see FIG. 3).

A belt shape seal member 98 is fit to the outer periphery of the second side edge 902 from the outside.

The seal member 98 is a member formed of an elastic material having a large liner expansion coefficient (for example, rubber) and having a predetermined width W4. The seal member 98 is formed in a curved shape corresponding to the shape of the second side edge 902.

As shown in FIG. 2B, when the cover portion 9 is assembled to the second cover portion 7 of the body portion 5, the outer peripheral edge of the seal member 98 is pressed against the inner periphery of the outer wall portion 72 of the second cover portion 7, and the gap CL2 between the outer wall portion 72 of the body portion 5 and the base portion 90 of the cover portion 9 is sealed by the seal member 98.

In this state, an accommodating chamber Sb for the driven sprocket DS (rotating member accommodating chamber) is formed outside of the driven sprocket DS.

As shown in FIG. 2B, in a state where the cover portion 9 is assembled to the second cover portion 7, as for the lower region of the driven sprocket DS, one side surface DSa and the other side surface DSb in the direction of the rotation axis X3 are covered by the base portion 70 of the second cover portion 7 and the base portion 90 of the cover portion 9, respectively, and the outer periphery of the driven sprocket DS is covered by the outer wall portion 72 of the second cover portion 7.

The lower region of the driven sprocket DS is disposed in a state where the lower region of the driven sprocket DS is surrounded by the second cover portion 7 of the baffle plate 4 and the cover portion 9.

As described above, the body portion 5 of the baffle plate 4, the oil hole 65 (see FIG. 3) is provided at the outer wall portion 62 surrounding the outer periphery of the final gear 25 while keeping the predetermined distance.

At the outer wall portion 62, the oil hole 65 is provided in the vertical line direction in the installation state of the automatic transmission 1 and at a position below the oil level OL_level of the oil OL.

In the present embodiment, the negative pressure generated when the final gear 25 rotates causes the oil between the outer periphery of the outer wall portion 62 and the inner periphery of the peripheral wall portion 11 of the transmission case 10 to flow to the final gear 25 through the oil hole 65.

That is, the oil OL outside the outer wall portion 62 can flow into the inside of the outer wall portion 62.

Here, when the amount of oil OL flowing into the inside of the outer wall portion 62 increases, the oil OL flowed into becomes friction against the rotation of the final gear 25.

Further, if the amount of oil OL flowing into the inside of the outer wall portion 62 becomes too small, not only the lubrication of the final gear 25 but also the lubrication around the reduction gear 35 becomes insufficient. This is because the amount of oil scraped up by the final gear 25 and supplied to the reduction gear 35 is reduced.

The baffle plate 4 is provided for the following purposes.
(a) to guide the oil OL scraped up by the final gear 25 to the reduction gear 35 (other gear).
(b) to reduce the resistance (stirring resistance) when the final gear 25 rotates.

Therefore, the opening diameter of the oil hole 65 is set to the minimum diameter that can achieve the above purposes (a), (b) through experimental results and simulations.

In the automatic transmission, when the oil pump OP is driven, the oil in the oil pan 16 is sucked into the oil pump OP through the oil strainer 17 (see FIG. 1A) attached to a control valve body (not shown).

Then, the oil OL, the pressure of which is regulated by the oil pump OP, is used for the operation of the transmission mechanism portion and the lubrication of rotating elements, and then returns to the oil pan 16 by its own weight.

In the oil pan 16 fixed to the lower portion of the transmission case 10, the oil of an amount necessary for the operation of the transmission mechanism portion and the lubrication of the rotation elements is stored.

Here, immediately after the start of the engine in a low temperature environment such as winter, since the temperature of the oil in the automatic transmission 1 is low, the fluidity of the oil OL becomes low.

In such a case, since the return of the oil OL to the oil pan 16 delays, if the oil OL in the oil pan 16 is insufficient, air may be sucked in from the suction port of the oil strainer 17.

In this case, the oil containing air is used for the operation of the transmission mechanism portion, and a shock or the like may occur.

In the present embodiment, in order to improve the return of the oil in the baffle plate 4 to the oil pan 16 when the temperature of the oil OL is low, the belt shape rib 69 and the ribs 79 are provided on the baffle plate 4, and the ribs 89 are provided on the cover portion 8.

These belt shape rib 69 and the ribs 79, 89 are formed of the material having a large linear expansion coefficient at low temperatures like the material constituting the components of the baffle plate 4.

Therefore, in the present embodiment, the belt shape rib 69 and the ribs 79, 89 shrink greater than other portions at low temperatures, and thus the other portions adjacent to the belt shape rib 69 and the ribs 79, 89 are deformed greatly.

Hereinafter, a concrete description will be given.

FIGS. 7A and 7B are diagrams illustrating an operation of the baffle plate 4 and illustrating an operation of the belt shape rib 69 and ribs 79, 89.

FIG. 7A is a view for explaining deformation of the outer wall portion 62 and the base portion 80 caused by the belt shape rib 69 and the rib 89. FIG. 7B is a diagram for explaining the deformation of the outer wall portion 72 caused by the ribs 79.

As shown in FIG. 7A, at low temperatures, the ribs 89 on the cover portion 8 shrink greatly than other regions (base portion 80, inner wall portion 81) adjacent to the ribs 89.

Here, among the regions adjacent to the ribs 89 (base portion 80, inner wall portion 81), since the inner wall portion 81 is formed in a bent shape at the boundary portion between the first cylindrical portion 811 and the second cylindrical portion 812, the inner wall portion 81 is harder to bend than the base portion 80.

On the other hand, the rigidity and strength of the base portion 80 is increased at the inner wall portion 81 side (inner side in the radial direction: the rotation axis X1 side) and the outer side in the radial direction (outer peripheral portion 80a (free end) can displace in the direction of the rotation axis X1.

Therefore, as the ribs 89 shrink, the base portion 80 is pulled toward the ribs 89 side, and the outer peripheral portion 80a side of the base portion 80 is curved in a direction away from the final gear 25.

At low temperatures, the belt shape rib 69 of the first cover portion 6 shrinks greatly than other regions (base portion 60, outer wall portion 62) adjacent to the belt shape rib 69 (see arrows in the drawing).

Here, among the regions adjacent to the belt shape rib 69 (base portion 60, outer wall portion 62), the base portion 60 is harder to bend than the outer wall portion 62, since a step formed by the concave groove 67 is provided at the base portion 60 and this portion also functions as a reinforce rib.

On the other hand, in the outer wall portion 62, the strength of the base portion 60 side is higher than that of the end portion 62c on the cover portion 8 side, and the end portion 62c (free end) of the outer wall portion 62 is displaceable in the radial direction of the rotation axis X1.

Therefore, in the baffle plate 4, when the belt shape rib 69 and the ribs 89 shrink at low temperatures, the end portion 62c side of the outer wall portion 62 and the outer peripheral portion 80a side of the base portion 80 are displaced in the direction away from each other, and the seal member 88 provided on the outer peripheral portion 80a is displaced in the direction away from the outer wall portion 62 (see FIG. 7A).

As a result,
(I) sealing of the gap between the inner periphery of the outer wall portion 62 of the body portion 5 and the base portion 80 of the cover portion 8 by the seal member 88 is cancelled when the temperature of the oil OL is low, and an aperture CL' is formed.

Then, since the outer wall portion 62 is positioned on the lower side in the vertical line direction in the installation state of the automatic transmission, low fluidity oil OL accumulated inside the outer wall portion 62 is discharged downward toward the oil pan 16.

Here, in the present embodiment, the belt shape rib 69 is provided so as to extend from the outer wall portion 62 to the base portion 60. Therefore, when the belt shape rib 69 shrinks, the belt shape rib 69 is pulled toward the base portion 60 side having high rigidity (left side in FIG. 7A). Therefore, by increasing the amount of displacement of the end portion 62c side of the outer wall portion 62, the aperture CL' from the outer peripheral portion 80a of the base portion 80 of the cover portion 8 can be widened.

Furthermore, at the deformation promoting portion 691 of the belt shape rib 69, a plurality of concave portions 693 (slits) are provided at intervals in the circumferential direction around the rotation axis X1.

Therefore, the amount of deformation in the circumferential direction around the rotation axis X1 becomes smaller in the region where the concave portions 693 are provided than in the region where the deformation promoting portion 691 are provided.

Therefore, when viewed from the direction of the rotation axis X1, it is possible to deform the end portion 62c side of the outer wall portion 62 having an arc shape in an undulating shape.

As a result, the aperture CL' from the outer peripheral portion 80a of the base portion 80 of the cover portion 8 can be partially widened, so the oil OL having low fluidity accumulated inside the outer wall portion 62 can be appropriately discharged downward toward the oil pan 16.

Furthermore, as shown in FIG. 7B, at the outer wall portion 72 of the second cover portion 7, the ribs 79 are provided on the outer periphery of the base portion 70.

Therefore, in the outer wall portion 72, the strength of the base portion 70 side is higher than that of the end portion 72c on the cover portion 9 side, and thus among the regions adjacent to the ribs 79 (base portion 70, the outer wall portion 72), the outer wall portion 72 is easily displaced.

Therefore, in the baffle plate 4, when the ribs 79 shrink at low temperatures, the end portion 72c (free end) side of the outer wall portion 72 is displaced in the radial direction of the rotation axis X3 and in the direction away from the base portion 90, and the seal member 98 provided on the outer peripheral portion 90a of the base portion 90 separates from the outer wall portion 72 (see FIG. 7B).

As a result,
(II) sealing of the gap between the inner periphery of the outer wall portion 72 of the body portion 5 and the base portion 90 of the cover portion 9 is cancelled when the temperature of the oil OL is low, and the aperture CL' is formed.

Then, since the outer wall portion 72 is positioned on the lower side in the vertical direction in the installation state of the automatic transmission, low fluidity oil OL accumulated inside the outer wall portion 72 is discharged downward toward the oil pan 16.

As described above, in the present embodiment, in order to improve the return of the oil in the baffle plate 4 to the oil pan 16 when the temperature of the oil OL is low, the belt shape rib 69 and the ribs 79 are provided on the body portion 5 and the ribs 89 are provided on the cover portion 8.

These belt shape rib 69 and ribs 79, 89 are formed of a material having a large linear expansion coefficient at low temperatures (material that shrinks at low temperatures), and the portions of the belt shape rib 69 and the ribs 79, 89 shrink larger than the other portions at low temperatures.

Thus, the sealing of the gap CL1 (gap between the outer wall portion 62 and the base portion 80) by the seal member 88 and the sealing of the gap CL2 (gap between the outer wall portion 72 and the base portion 90) by the seal member 98 are cancelled, and the aperture CL' through which the oil OL can be discharged is formed.

There are materials that expand at low temperatures and materials that shrink at low temperatures.

First, by selecting the latter material, the displacement of the components of the baffle plate portion (outer wall portions 62, 72 of the body portion 5, base portion 80 of the cover portion 8) is urged at low oil temperatures, and thus the sealing by the seal members 88, 98 is cancelled.

Here, the sealing by the seal members may not be cancelled by simply replacing the components (belt shape rib 69, ribs 78, 89) of the baffle plate 4 (baffle plate portion) with the material that shrinks at a low temperature.

This is because, for example, if the shrinkage amount at low temperatures so small that the seal members 88, 98 cannot be displaced by the shrinkage away from the outer wall portions 62, 72 of the baffle plate 4, the sealing cannot be cancelled.

Therefore, in the present embodiment, considering the shrinkage amount, the dimensions of the seal members 88, 98 (widths W3, W4) and/or the dimensions of the respective portions of the baffle plate 4 are set.

For example, in consideration of the shrinkage amount when the temperature decreases from the reference temperature to a predetermined temperature, the following dimensions are set so that the seal members 88, 98 separate from the outer wall portions 62, 72 of the baffle plate 4 when shrinkage of such a shrinkage amount occurs.

The dimensions of the seal members 88, 98 (widths W3, W4) and/or the dimensions of the baffle plate 4 (the heights h1, h3 of the outer wall portions 62, 72, the width W1 of the base portion 80 of the cover portion 8, the gap CL1 (see FIG. 5B) between the outer peripheral portion 80a of the base portion 80 of the cover portion 8 and the outer wall portion 62, the gap CL2 (see FIG. 6B) between the outer peripheral portion 90a of the base portion 90 of the cover portion 9 and the outer wall portion 72).

Here, as the reference temperature, an arbitrary temperature higher than a predetermined temperature may be set. For example, the reference temperature may be set to a normal temperature (25° C.), or may be set to an arbitrary temperature in a normal use temperature region (several ten degrees Celsius to one hundred and several ten degrees Celsius).

That is, for example, the smaller the pressing force of the seal members 88, 98 against the baffle plate (outer wall portions 62, 72) at the reference temperature, the smaller the shrinkage amount required when the temperature decreases below the predetermined temperature from the reference temperature.

Since the pressing forces of the seal members 88, 98 against the baffle plate 4 (outer wall portions 62, 72) depend on the dimensions of the seal members 88, 98 and/or the dimensions of the baffle plate 4, these dimensions may be set such that the pressing force against the baffle plate 4 becomes small at the normal temperature.

By setting dimensions in this way, the aperture is formed at low temperatures, and the return of the oil from the inside of the baffle plate 4 (baffle plate portion) to the oil pan 16 can be promoted.

The dimensions can be appropriately set by a person skilled in the art by conducting experiments and/or calculations beforehand in accordance with the characteristics of the materials used, such as a linear expansion coefficient.

For example, the dimensions may be predetermined in various manners as follows.

Measure changes in the dimensions by changing the temperature of the baffle plate 4 (baffle plate portion).

Measure changes in the dimensions by making a sample using the material used for the baffle plate 4 (baffle plate portion) and changing the temperature of the sample.

Calculate the theoretical shrinkage amount from the linear expansion coefficient of the material used for the baffle plate 4 (baffle plate portion) and the design dimensions of the baffle plate portion.

Further, in this embodiment, as the material constituting the belt shape rib 69 and the ribs 79, 89, a polymer material is employed as an example.

Since the linear expansion coefficient of the material is not limited, any material such as a metal (including a pure metal and an alloy), a ceramic, polymer (in particular, an organic polymer (a polymer composed of an organic compound), or the like may be used.

However, when using a material having a small linear expansion coefficient (such as a metal), the pressing force of the seal members 88, 98 against the baffle plate need to be set extremely small at the reference temperature, and thus the sealing by the seal members 88, 98 will be lowered.

The linear expansion coefficient is preferably in the following range.

For metals, linear expansion coefficients between $5\text{-}25 \times 10^{-6} K^{-1}$. For ceramics, linear expansion coefficients between $0.5\text{-}15 \times 10^{-6} K^{-1}$. For polymers, linear expansion coefficients between $50\text{-}300 \times 10^{-6} K^{-1}$.

As described above, the present embodiment exemplifies the case where all of the constituent elements of the baffle plate portion (baffle plate 4), that is, the body portion 5, the cover portions 8, 9, and the seal members 88, 98 are all formed of a material such as a polymer having a large linear expansion coefficient at low temperatures.

The present invention is not limited only to this embodiment. At least one of the body portion 5, the cover portions 8, 9 and the seal members 88, 98 may be formed of a material such as a polymer having a large linear expansion coefficient at low temperatures. In this case, a combination of constituent elements formed of a material such as a polymer can be appropriately selected.

In addition, when the body portion 5 and the cover portions 8, 9 are formed of a material such as a polymer, all of the body portion 5 and the cover portions 8, 9 need not be formed of a material such as a polymer, and only a partial region of them may be formed of a material such as a polymer.

Similarly, when the seal members 88, 98 are formed of a material such as a polymer, all of the seal members 88, 98 need not be formed of a material such as a polymer, and only a partial region of them may be formed of a material such as a polymer.

As described above, the present embodiment has the following configuration.

(1) The driving force transmission (automatic transmission 1) includes:

the baffle plate portion (baffle plate 4) including the pair of baffle plates (body portions 5, cover portions 8, 9) and the seal members 88, 98 disposed within the space between the pair of baffle plates;

the rotating member (final gear 25, driven sprocket DS) disposed within the rotating member chamber (accommodating chambers Sa, Sb) that is the space surrounded by the baffle plate portion;

the oil pump OP that serves as the source of oil for lubrication (oil OL) supplied to the rotating member (final gear 25, driven sprocket DS), and the oil pan 16 in which oil (oil OL) is stored and from which the oil pump OP sucks the oil.

At least one of, one of the pair of baffle plates (body portion 5 and cover portions 8, 9), the other one of the pair of baffle plates (body portion 5 and cover portions 8, 9), and the seal members 88, 98 is formed by including a material that shrink as the oil temperature (temperature of the oil OL) decreases (a material having a large linear expansion coefficient at a low temperature).

The baffle plate portion (body portion 5, the cover portions 8, 9) is dimensioned such that the region (gaps CL1, CL2) between the pair of baffle plates (body portion 5, the cover portions 8, 9) is sealed by the seal members 88, 98 when the oil temperature is equal to or higher than the predetermined oil temperature and the aperture CL' is formed in the region between the pair of baffle plates (body portion 5, the cover portions 8, 9) when the oil temperature is less than the predetermined oil temperature.

The gap CL1 is the gap between the inner periphery of the outer wall portion 62 of the body portion 5 and the outer peripheral portion 80*a* of the base portion 80 of the cover portion 8.

The gap CL2 is the gap between the inner periphery of the outer wall portion 72 of the body portion 5 and the outer peripheral portion 90*a* of the base portion 90 of the cover portion 9.

By configuring in this way, the sealing of the gaps CL1, CL2 between the inner peripheries of the outer wall portions 62, 72 of the body portion 5 and the outer peripheral portions 80*a*, 90*a* of the base portions 80, 90 of the cover portions 8, 9 by the seal members 88, 98 are cancelled when the temperature of the oil OL is low and the apertures CL', CL' are formed.

Then, since the outer wall portions 62, 72 are positioned on the lower side in the vertical line direction in the installation state of the automatic transmission 1, the oil OL having low fluidity accumulated inside the outer wall portions 62, 72 is discharged downward toward the oil pan 16.

Thus, the aperture CL' is formed at low temperatures, and it is possible to promote the oil return (return of the oil OL) from the inside of the baffle plate portion (body portion 5 and the cover portions 8, 9) to the oil pan 16.

Further, by providing the seal members 88, 98, the aperture CL' is made to "0 (zero)" by the seal members 88, 98 until the temperature becomes less than the predetermined temperature, and therefore, the effect of suppressing the oil entering when the oil temperature becomes high can be enhanced.

The present embodiment has the following configuration.

(2) The material is a polymer material, and the polymer material is a resin material or a rubber material.

By using a polymer which is a material having a large linear expansion coefficient, the shrinkage amount can be increased. It is possible to increase the pressing force of the seal members 88, 98 against the baffle plate (outer wall portions 62, 72) at the reference temperature, and it is possible to improve the sealing by the seal members 88, 98.

The present embodiment has the following configuration.

(3) The baffle plate portion (body portion 5, cover portion 8) has the ribs (belt shape rib 69, ribs 79, 89) formed of a polymer material.

When the ribs (belt shape rib 69, ribs 79, 89) formed of a polymer material are formed at the baffle plate portion (body portion 5, cover portion 8) or the polymer material forming the seal members, since the shrinkage amount and the expansion amount due to temperature change becomes large as the thickness of the polymer material increases, the aperture CL' formed at low temperatures can be widened.

Therefore, the shrinkage amount and the expansion amount due to temperature change can be increased by locally forming thick portions by forming the ribs (belt shape rib 69, ribs 79, 89).

Thus, even if the pressing force of the seal members 88, 98 against the outer wall portions 62, 72 at the reference temperature is increased, the seal members 88, 98 can displace away from the outer wall portions 62, 72 to form the aperture CL'. Therefore, the sealing of the accommodating chambers Sa, Sb can be improved at the baffle plate 4.

Here, it is conceivable to thicken the entire baffle plate 4, but instead, by forming ribs formed locally, the effect of weight reduction and cost reduction can be obtained.

Further, for example, since the baffle plate portion (body portion 5, cover portions 8, 9) or the seal members 88, 98 formed of a polymer material are formed by cooling the melted raw material, the surface area of the thick portions can be increased, and the cooling efficiency can be relatively increased.

If the cooling efficiency is poor, distortion may occur and cracks may be developed. By increasing the cooling efficiency, occurrence of such a problem may be suitably prevented.

The present embodiment has the following configuration.

(4) The automatic transmission 1 (driving force transmission device) includes:
the baffle plate portion (baffle plate 4) including the pair of baffle plates (body portion 5, cover portions 8, 9);
the rotating member (final gear 25, driven sprocket DS) disposed within the rotating member chamber (accommodating chambers Sa, Sb) which is the space surrounded by the baffle plate portion (baffle plate 4);
the oil pump OP that serves as the source of the oil for lubrication (oil OL) supplied to the rotating member (final gear 25, driven sprocket DS); and
the oil pan 16 in which the oil (oil OL) is stored and from which the oil pump OP sucks the oil.

At least one of the pair of baffle plates (body portion 5, cover portions 8, 9) is formed by including a polymer material.

The baffle plate portion (baffle plate 4) has ribs (belt shape rib 69 and ribs 79, 89) formed of a polymer material.

As the thickness of the polymer material increases, the shrinkage amount and the expansion amount due to temperature change increase. Therefore, the shrinkage amount and the expansion amount due to temperature change can be increased by locally forming thick portions by forming the ribs (belt shape rib 69, rib 79).

Therefore, in the case of the baffle plate without the seal member, since the change in the aperture due to temperature change can be increased, the aperture at the reference temperature can be made smaller and the effect of reducing the stirring resistance can be improved.

On the other hand, in the case of the baffle plate with the seal member, the change in the aperture due to temperature change can be increased. Thus, the pressing force of the seal member can be increased at the reference temperature, sealing can be improved, and the effect of reducing the stirring resistance can be improved.

The present embodiment has the following configuration.

(5) A plurality of ribs 79 and 89 are provided.

If ribs of the same volume are formed, since the surface area of a plurality of ribs can be made larger than that of a single rib, the cooling efficiency can be improved.

The present embodiment has the following configuration.

(6) The slits (concave portions 693) are formed at the rib 69.

Since the surface area can be increased by providing the slits (concave portions 693), the cooling efficiency at the portion of the belt shape rib 69 can be enhanced. The surface area may be increased by providing slits at other ribs 79,879.

The present embodiment has the following configuration.

(7) The ribs (belt shape rib 69, ribs 89) are arranged at a position away from the gap CL1 causing the aperture CL'.

The ribs 79 are arranged at a position away from the aperture (gap CL2).

The belt shape rib 69 is arranged at a position away from the gap CL1 in the direction of the rotation axis X1.

The ribs 89 are arranged at positions away from the gap CL1 in the radial direction of the rotation axis X1.

The gap CL1 is the gap between the outer wall portion 62 on which the belt shape rib 69 is provided and the base portion 80 of the cover portion 8 on which the ribs 89 are provided.

The gap CL1 is the gap in the radial direction of the rotation axis X1 between the end portion 62c of the outer wall portion 62 and the outer peripheral portion 80a of the base portion 80.

The gap CL2 is the gap between the outer wall portion 72 on which the ribs 79 are provided and the base portion 90 of the cover portion 9.

The gap CL2 is the gap in the radial direction of the rotation axis X1 between the end portion 72c of the outer wall portion 72 and the outer peripheral portion 90a of the base portion 90.

By placing the ribs (belt shape rib 69, ribs 79, 89) at positions away from the gap CL1 that causes the aperture CL', the change in the aperture CL' due to shrinkage and expansion can be increased.

That is, if the shrinkage amount and the expansion amount are constant, the change amount of the aperture CL' due to the shrinkage and the expansion increases as the distances from the gaps CL1, CL2 increases, and the change amount of the aperture CL' increases as the shrinkage amount and the expansion amount increase.

Therefore, as the distances of the ribs (belt shape rib 69, ribs 79, 89), the shrinkage amount and expansion amount of which is large, from the gaps CL1, CL2 which cause the aperture CL' increase, the change amount of the caused aperture CL' increases.

The present embodiment has the following configuration.

(8) At least one of the pair of baffle plates has the plate portion (cover portion 8) which adjoins the gap CL1 that causes the aperture.

when the plate portion (cover portion 8) is partitioned into two regions (base portion 80, inner wall portion 81) in the axial direction (rotation axis X1) of the rotating member (final gear 25), the ribs 79 are arranged such that the area where the ribs 89 overlap with one of the two regions (inner wall portion 81) not adjacent to the aperture (gap CL1) is larger than the area where the ribs 89 overlap with the other one of the two regions (base portion 80) adjacent to the aperture (gap CL1).

The region (inner wall portion 81) not adjacent to the aperture extends in the direction of the rotation axis X1 from a position away from the aperture (gap CL1) in the region (base portion 80) adjacent to the aperture (gap CL1).

By placing the ribs 89 in the region away from the aperture (gap CL1), the ribs 89 can be positioned away from the gap CL1 that causes the aperture and the change amount in the aperture can be increased.

The present embodiment has the following configuration.

(9) The body portion 5, which is at least one of the pair of baffle plates, has the first plate portion (base portion 60), and the second plate portion (outer wall portion 62) which is adjacent to the first plate portion and the gap CL1 causing the aperture and projecting in the axial direction (direction of the rotation axis X1) of the rotating member (final gear 25).

The rib (belt shape rib 69) is provided on the second plate portion (outer wall portion 62).

Since the rib 69 (belt shape rib 69) can be provided at a position away from the gap CL1 which causes the aperture, the change amount of the aperture can be increased.

(10) The rib (belt shape rib 69) is disposed in contact with the boundary between the first plate portion (base portion 60) and the second plate portion (outer wall portion 62).

The rib (belt shape rib 69) is provided across the first plate portion (base 60) and the second plate portion (outer wall portion 62), and is disposed in contact with the first plate portion (base portion 60) and the second plate portion (outer wall portion 62).

Since the ribs 69 can be provided at a position away from the gap CL1 which causes the aperture, the change amount of the aperture can be increased.

In addition, since the force can be directly applied to the first plate portion (base portion 60), the change amount of the aperture can be increased.

The present embodiment has the following configuration.

(11) The ribs (belt shape rib 69, ribs 89) are provided on both of the pair of baffle plates (body portion 5, cover portion 8).

Since the shrinkage force of the ribs (belt shape rib 69 and ribs 89) can be applied to both the body portion 5 and the cover portion 8, the force for opening the aperture (gap CL1) can be applied to both the outer wall portion 62 of the body portion 5 and the base portion 80 of the cover portion 8. Therefore, the change amount of the aperture can be increased.

The present embodiment has the following configuration.

(12) The ribs (belt shape rib 69, ribs 89) is disposed outside the rotating member chamber (accommodating chamber Sa) for the rotating member (final gear 25).

If the ribs (belt shape rib 69, ribs 89) are disposed inside the rotating member chamber (accommodating chamber Sa), there is a possibility that the ribs interfere with the rotating member (final gear 25) and the limitation on the layout of the rotating member (final gear 25) may increase. Therefore, the ribs are disposed outside the rotating member chamber.

The present embodiment has the following configuration.

(13) The rotating member is the gear (final gear 25) or the chain sprocket (driven sprocket DS).

The final gear 25 and the driven sprocket DS are arranged at the lower part in the transmission case, and the baffle plate (body part 5, cover part 8) is provided in a range across the final gear 25 and the driven sprocket DS.

Therefore, by providing the ribs so that the sealing of the gap CL1 by the seal member is cancelled, the oil OL stored in the baffle plate at extremely low temperature can be returned to the oil pan 16 provided at the lower portion of the transmission case 10.

Since the sealing by the seal member 88 can be cancelled at extremely low temperature only, it improves the fuel consumption.

In the embodiment described above, the case where the driving force transmission device is an automatic transmission for a vehicle has been exemplified. The driving force transmission device of the present invention is not limited to only an automatic transmission for a vehicle.

The present invention is also applicable to a gear train composed of a plurality of gears, wherein at least one gear is configured to scrape up oil in a housing case of the gear train. As such a device, a deceleration device for decelerating and outputting the input rotation is exemplified.

While the embodiments of the present invention have been described above, the present invention is not limited to aspects shown in these embodiments. Changes and modifications can be made appropriately within the scope of the technical ideas of the present invention.

The present application claims a priority of Japanese Patent Application No. 2018-095159 filed with the Japan Patent Office on May 17, 2018, all the contents of which are hereby incorporated by reference.

The invention claimed is:

1. A driving force transmission device comprising:
a baffle plate portion including a pair of baffle plates and a sealing member disposed in a region between the pair of baffle plates;
a rotating member disposed within a rotating member chamber that is a space surrounded by the baffle plate portion;
an oil pump that serves as a source of oil for lubrication supplied to the rotating member; and
an oil pan in which the oil is stored and from which the oil pump sucks the oil, wherein
at least one of the following (i) or (ii) includes material configured to shrink as an oil temperature decreases:
(i) one of the pair of baffle plates, or
(ii) the other one of the pair of baffle plates (iii), and
the baffle plate portion is dimensioned such that an outer peripheral edge of the seal member is pressed against an outer wall portion of the baffle plate portion covering an outer periphery of the rotating member when the oil temperature is equal to or higher than a predetermined oil temperature and an aperture is formed in the region between the pair of baffle plates to stop sealing by the seal member when the oil temperature is less than the predetermined oil temperature.

2. A driving force transmission device as defined in claim 1, wherein the material is a polymer material.

3. A driving force transmission device as defined in claim 2, wherein the polymer material is a resin material or a rubber material.

4. A driving force transmission device as defined in claim 2, wherein the baffle plate portion has a rib formed of the polymer material.

5. A driving force transmission device as defined in claim 4, wherein the rib is provided a position away from the aperture.

6. A driving force transmission device as defined in claim 4, wherein a plurality of ribs are provided.

7. A driving force transmission device as defined in claim 4, wherein a slit is provided at the rib.

8. A driving force transmission device as defined in claim 4, wherein the rib is disposed outside the rotating member chamber.

* * * * *